US012573761B2

(12) United States Patent
Tsai et al.

(10) Patent No.: US 12,573,761 B2
(45) Date of Patent: Mar. 10, 2026

(54) VERTICAL ANTENNA STRUCTURE

(71) Applicants: ONEWAVE TECHNOLOGY CO., LTD., Taipei City (TW); Yun-Chan Tsai, Taipei City (TW)

(72) Inventors: Yun-Chan Tsai, Taipei City (TW); Shi-Yu Chiu, Taipei City (TW); Po-Huai Huang, Taipei City (TW); Shi-Hong Yang, Taipei City (TW)

(73) Assignees: ONEWAVE TECHNOLOGY CO., LTD., Taipei City (TW); Yun-Chan Tsai, Taipei City (TW)

( * ) Notice: Subject to any disclaimer, the term of this patent is extended or adjusted under 35 U.S.C. 154(b) by 333 days.

(21) Appl. No.: 18/369,671

(22) Filed: Sep. 18, 2023

(65) Prior Publication Data

US 2025/0096471 A1 Mar. 20, 2025

(51) Int. Cl.

*H01Q 9/04* (2006.01)
*H01Q 1/22* (2006.01)
*H01Q 1/48* (2006.01)

(52) U.S. Cl.

CPC ............. *H01Q 9/0442* (2013.01); *H01Q 1/22* (2013.01); *H01Q 1/48* (2013.01)

(58) Field of Classification Search

CPC ........ H01Q 1/38; H01Q 1/243; H01Q 9/0407; H01Q 1/48; H01Q 1/22; H01Q 9/0414; H01Q 1/2283; H01Q 21/08; H01Q 21/065; H01Q 9/045; H01Q 21/28

See application file for complete search history.

(56) References Cited

U.S. PATENT DOCUMENTS

2021/0126348 A1* 4/2021 Kim .......................... H01Q 1/38
2021/0141426 A1* 5/2021 Kim .......................... H01Q 1/46
2023/0327322 A1* 10/2023 Kim ........................ H01Q 1/243

* cited by examiner

*Primary Examiner* — Wei (Victor) Y Chan

(74) *Attorney, Agent, or Firm* — HDLS IPR SERVICES; Chun-Ming Shih

(57) ABSTRACT

A vertical antenna structure is electrically fixed and connected to a main board of an electronic apparatus. The vertical antenna structure includes a circuit board, an electrode layer, and a semi-hole electrode layer. The circuit board is a square body with a front surface, a back surface, a top surface, a bottom surface and two side surfaces. The electrode layer is arranged on the front surface and the back surface of the circuit board. The semi-hole electrode layer is arranged on the bottom surface of the circuit board. The semi-hole electrode layer is electrically fixed and connected to the electrode layer. Moreover, the electrode layer and the semi-hole electrode layer are electrically fixed and connected to the main board.

11 Claims, 7 Drawing Sheets

VERTICAL ANTENNA STRUCTURE

BACKGROUND OF THE DISCLOSURE

Technical Field

The present disclosure relates to an antenna, and especially relates to a vertical antenna structure soldered on a circuit board.

Description of Related Art

With the popularity of the Internet, people are increasingly dependent on the Internet, and more and more Internet apparatuses have been developed, such as Wi-Fi products, Internet communication products, Internet of Things, webcams, IP CAM, routers, or modems, etc. equipment. Most of the antenna structures used in these apparatuses are made of different radiation layer patterns on the copper foils on the circuit boards to receive and transmit signals.

The currently used antenna structure belongs to the vertical type and is soldered on the main board of the electronic apparatus. When the vertical antenna structure is soldered to the main board, the antenna structure directly solders the electrode layer on the circuit board to the electrode layer on the main board. Since the electrode layers of the antenna structure use a large area or a larger number, accordingly the copper material used is also relatively large, which leads to an increase in manufacturing cost.

In addition, when the vertical antenna structure is soldered to the main board, one or several holes must be drilled on the main board where the antenna structure is soldered, so that the antenna structure may be directly inserted into the hole in an upright manner, allowing the electrode layer on the antenna structure may be electrically fixed and connected to the electrode layer on the edge of the hole. In this way, although the antenna structure may be vertically soldered on the main board, such design will destroy the original structural design of the main board, thus causing labor-intensive and time-consuming troublesome procedures in production.

In addition, in the design process of the radiation layer of the vertical antenna structure, when the transmitting-and-receiving frequency of the radiation layer reaches a certain specific transmitting-and-receiving frequency, if the area of the antenna structure body is not enough, the pattern shape of the radiation layer will be difficult to design, and then it is necessary to make another radiation layer on the main board to be electrically connected to the radiation layer on the antenna structure, so as to extend the length of the radiation layer of the antenna structure. In this way, it will increase the difficulty of manufacturing the antenna structure and the main board.

Therefore, how to reduce the production cost of the vertical antenna structure without destroying the structural design of the original main board, and how to extend the length of the radiation layer according to the transmitting-and-receiving frequency of the vertical antenna structure, are the main problems to be solved by the present disclosure.

SUMMARY OF THE DISCLOSURE

Therefore, the main object of the present disclosure is to solve the traditional deficiencies. The present disclosure redesigns the vertical antenna structure, and may reduce the production cost of the vertical antenna structure without destroying the structural design of the original main board, and the length of the radiation layer may be extended according to the requirements of the transmitting-and-receiving frequency of the vertical antenna structure.

In order to achieve the object mentioned above, the present disclosure provides a vertical antenna structure which is electrically fixed and connected on/to a main board of an electronic apparatus. The vertical antenna structure includes a circuit board, an electrode layer, and a semi-hole electrode layer. The circuit board is a square body (or a cuboid) with a front surface, a back surface, a top surface, a bottom surface and two side surfaces. The electrode layer is arranged on the front surface and the back surface of the circuit board. The semi-hole electrode layer is arranged on the bottom surface of the circuit board. The semi-hole electrode layer is electrically fixed and connected to the electrode layer. Moreover, the electrode layer and the semi-hole electrode layer are electrically fixed and connected on/to the main board.

In an embodiment of the present disclosure, the vertical antenna structure further includes a plurality of radiation layers with different patterns arranged on the front surface and the back surface of the circuit board respectively.

In an embodiment of the present disclosure, the radiation layers include a high-frequency radiation layer or a low-frequency radiation layer, or the radiation layers include the high-frequency radiation layer and the low-frequency radiation layer.

In an embodiment of the present disclosure, the semi-hole electrode layer is arranged on the two side surfaces or one of the two side surfaces of the circuit board.

In an embodiment of the present disclosure, the semi-hole electrode layer is electrically connected to the radiation layer on the front surface or the back surface of the circuit board, so as to extend a length of the radiation layer and adjust a transmitting-and-receiving frequency of the vertical antenna structure.

In an embodiment of the present disclosure, the electrode layer includes a first electrode layer and a second electrode layer arranged on the front surface and the back surface of the circuit board, and close to an edge of the bottom surface.

In an embodiment of the present disclosure, the semi-hole electrode layer is electrically connected to the first electrode layer or the second electrode layer, or the semi-hole electrode layer is electrically connected to the first electrode layer and the second electrode layer respectively.

In an embodiment of the present disclosure, the semi-hole electrode layer is formed by a continuous connection of several semi-hole electrode layers. Namely, the vertical antenna structure includes a plurality of the semi-hole electrode layers connected to each other continuously.

In an embodiment of the present disclosure, the semi-hole electrode layer is wavy, and is arranged on the bottom surface of the circuit board, and is electrically connected to the first electrode layer and the second electrode layer.

In an embodiment of the present disclosure, the main board includes a first ground layer, a second ground layer, a first clearance zone, a second clearance zone, a first electrode fixed-connection layer and a second electrode fixed-connection layer. The first ground layer is arranged on a front face of the main board. The second ground layer is arranged on a back face of the main board and is arranged symmetrically with the first ground layer. The first clearance zone is arranged on the front face of the main board. The second clearance zone is arranged on the back face of the main board and is arranged symmetrically with the first clearance zone. The first electrode fixed-connection layer and the second electrode fixed-connection layer are arranged on the first clearance zone of the main board. The first electrode fixed-connection layer and the second electrode fixed-connection layer are electrically fixed and connected to the first electrode layer and the second electrode layer respectively.

In an embodiment of the present disclosure, the main board further includes a signal feed-in layer arranged on the front face of the main board and coupled with the first ground layer. The signal feed-in layer is electrically connected to the first electrode fixed-connection layer.

In an embodiment of the present disclosure, the main board further includes a matching element electrically connected between the second electrode fixed-connection layer and the first ground layer to adjust an antenna frequency characteristic (of the vertical antenna structure).

In an embodiment of the present disclosure, the semi-hole electrode layer is semi-circular, semi-elliptical or polygonal.

DETAILED DESCRIPTION

Figure 1:
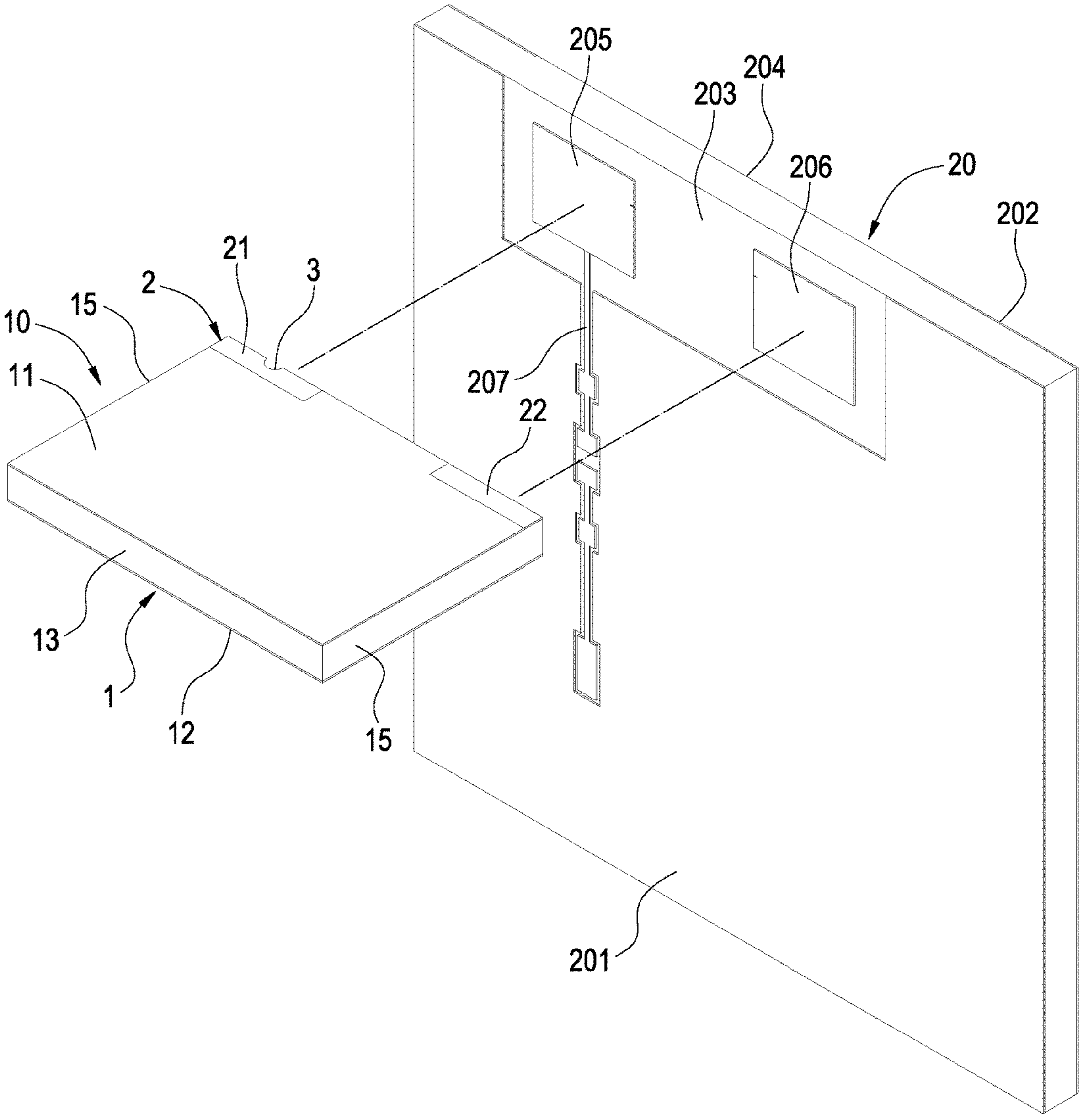
FIG. 1 shows an exploded schematic diagram of a vertical antenna structure and a main board of the first embodiment of the present disclosure.
Figure 2:
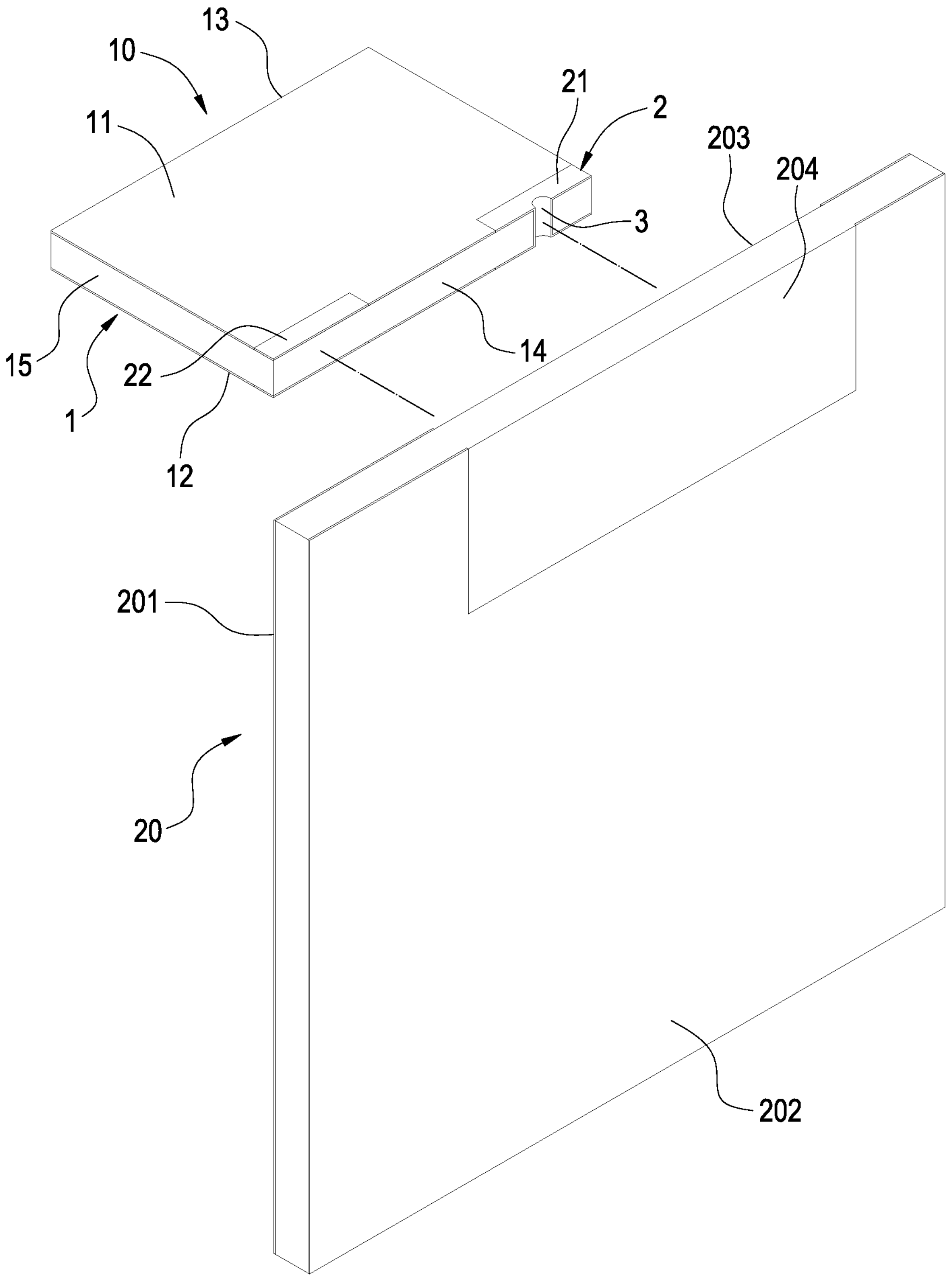
FIG. 2 shows an exploded schematic diagram of the vertical antenna structure and the main board from another perspective of FIG. 1.
Figure 3:
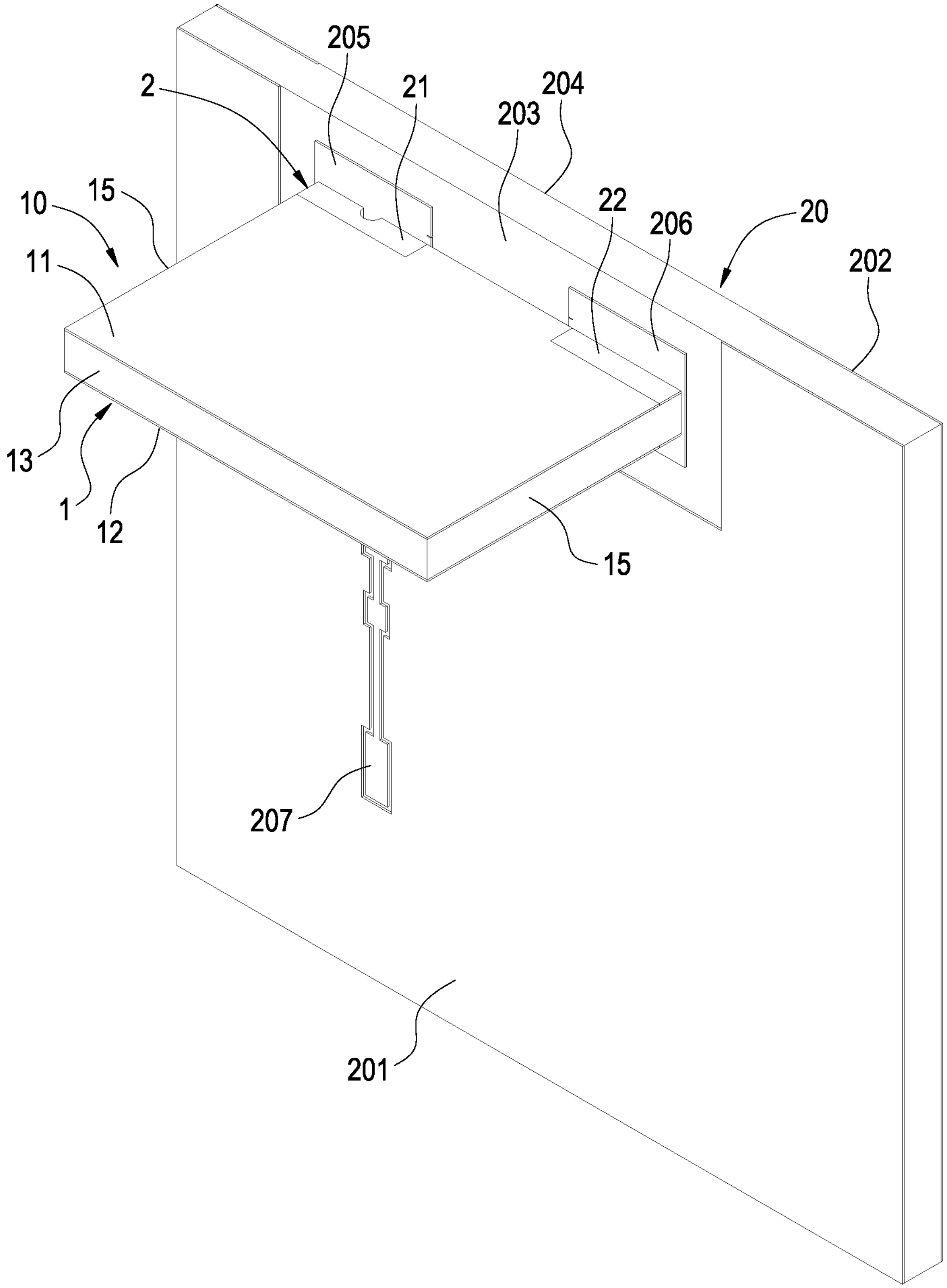
FIG. 3 shows a three-dimensional assembly schematic diagram of FIG. 1.
Figure 4:
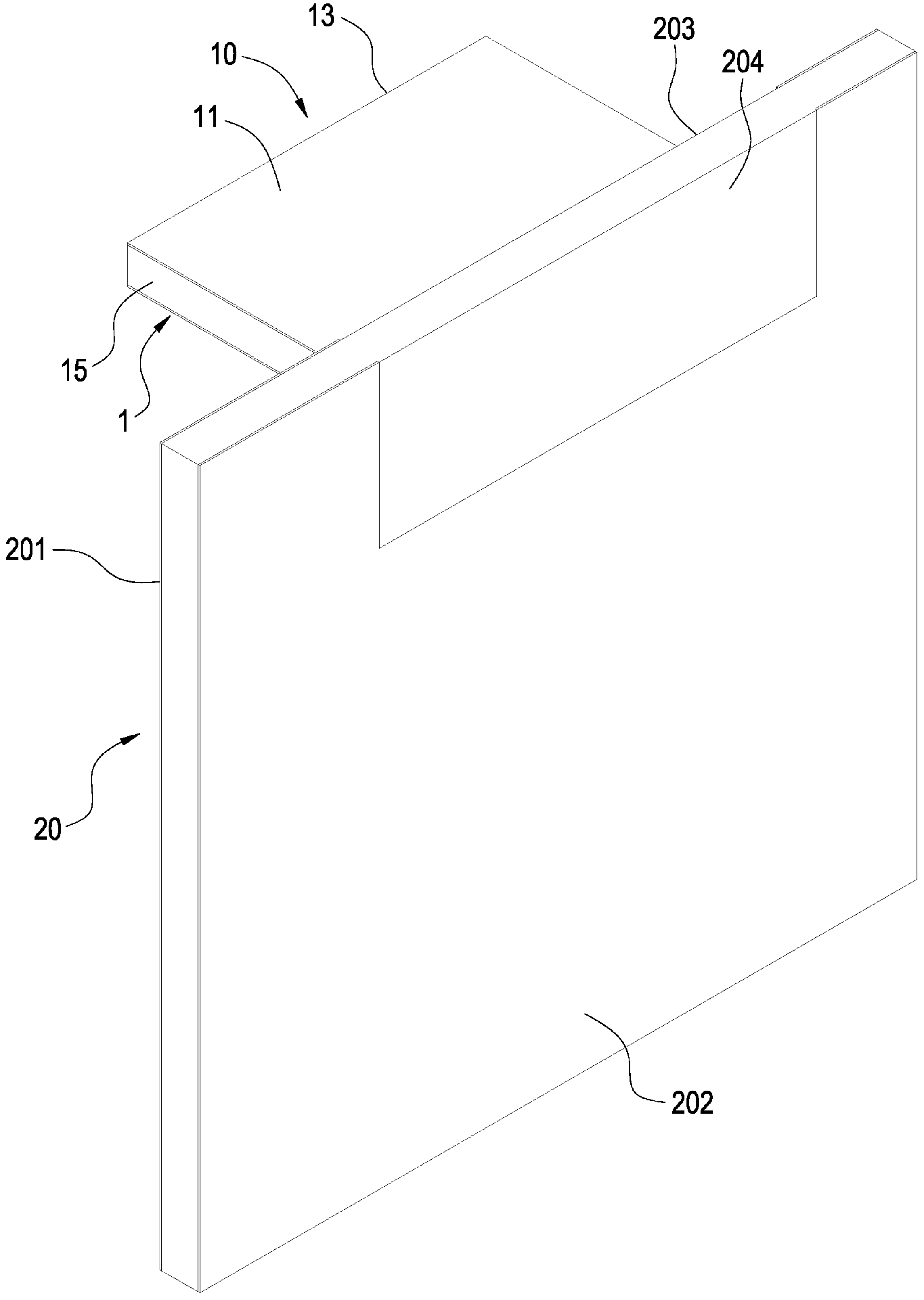
FIG. 4 shows a three-dimensional assembly schematic diagram of FIG. 2.

The technical content and detailed description of the present disclosure are hereby explained as follows with the diagrams:

FIG. 1 shows an exploded schematic diagram of a vertical antenna structure and a main board of the first embodiment of the present disclosure. FIG. 2 shows an exploded schematic diagram of the vertical antenna structure and the main board from another perspective of FIG. 1. FIG. 3 shows a three-dimensional assembly schematic diagram of FIG. 1. FIG. 4 shows a three-dimensional assembly schematic diagram of FIG. 2. As shown in FIG. 1 to FIG. 4, the vertical antenna structure 10 of the present disclosure includes a circuit board 1, an electrode layer 2 and a semi-hole electrode layer 3.

The circuit board 1 is a square body (or a cuboid) with a front surface 11, a back surface 12, a top surface 13, a bottom surface 14 and two side surfaces 15. The vertical antenna structure 10 further includes a plurality of radiation layers (not shown in FIG. 1 to FIG. 4) with different patterns arranged on the front surface 11 and the back surface 12 respectively. The radiation layers include a high-frequency radiation layer or a low-frequency radiation layer, or the radiation layers include the high-frequency radiation layer and the low-frequency radiation layer, which are used for receiving signals and transmitting signals. In FIG. 1 to FIG. 4, the circuit board 1 is a printed circuit board.

The electrode layer 2 is arranged on the front surface 11 and the back surface 12 of the circuit board 1, and is close to an edge of the bottom surface 14. The electrode layer 2 includes a first electrode layer 21 and a second electrode layer 22. The first electrode layer 21 and the second electrode layer 22 are provided to be electrically fixed and connected to the first electrode fixed-connection layer 205 and the second electrode fixed-connection layer 206 on the main board 20.

The semi-hole electrode layer 3 is arranged on the bottom surface 14 of the circuit board 1. The semi-hole electrode layer 3 is electrically fixed and connected to the first electrode layer 21 or the second electrode layer 22 on the front surface 11 and the back surface 12 of the circuit board 1. The electrode layer 2 and the semi-hole electrode layer 3 are electrically fixed and connected to electrode layers of the main board 20. In FIG. 1 to FIG. 4, the semi-hole electrode layer 3 is semi-circular, semi-elliptical or polygonal.

It is worth mentioning that the design of the semi-hole electrode layer 3 is to reduce the manufacturing cost of the vertical antenna structure 10, and under the principle of not destroying the original structure of the main board 20, the vertical antenna structure 10 is electrically fixed and connected to the first electrode fixed-connection layer 205 and the second electrode fixed-connection layer 206 on the main board 20.

When the vertical antenna structure 10 of the present disclosure is used with the main board 20 of the electronic apparatus, a first ground layer 201, a second ground layer 202, a first clearance zone 203 and a second clearance zone 204 are symmetrically arranged on a front face and a back face of the main board 20 respectively; namely, the main board 20 includes the first ground layer 201, the second ground layer 202, the first clearance zone 203 and the second clearance zone 204; the first ground layer 201 arranged on the front face is symmetrical with the second ground layer 202 arranged on the back face; the first clearance zone 203 arranged on the front face is symmetrical with the second clearance zone 204 arranged on the back face. The main board 20 further includes a first electrode fixed-connection layer 205 and a second electrode fixed-connection layer 206 arranged on the first clearance zone 203 of the main board 20. Moreover, the main board 20 further includes a signal feed-in layer 207 arranged on the front face of the main board 20 and coupled with the first ground layer 201. The signal feed-in layer 207 is electrically connected to the first electrode fixed-connection layer 205. Moreover, the second electrode fixed-connection layer 206 is electrically connected to the first ground layer 201 through a matching element (not shown in FIG. 1 to FIG. 4) to adjust an antenna frequency characteristic (of the vertical antenna structure 10).

In addition, the first electrode layer 21 and the second electrode layer 22 of the circuit board 1 are in contact with the first electrode fixed-connection layer 205 and the second electrode fixed-connection layer 206 of the main board 20, and are soldered with a solder, so that the solder flows into the semi-hole electrode layer 3, so that the first electrode layer 21 and the second electrode layer 22 are electrically fixed and connected to the first electrode fixed-connection layer 205 and the second electrode fixed-connection layer 206 of the main board 20.

Due to the design of the semi-hole electrode layer 3 of the vertical antenna structure 10, in addition to reducing the manufacturing cost of the vertical antenna structure 10, when the circuit board 1 and the main board 20 are electrically fixed and connected, there is no need to change the design of the original main board 20; the original structural design of the main board 20 is not destroyed; the vertical antenna structure 10 is electrically fixed and connected to the first electrode fixed-connection layer 205 and the second electrode fixed-connection layer 206 on the main board 20.

Figure 5:
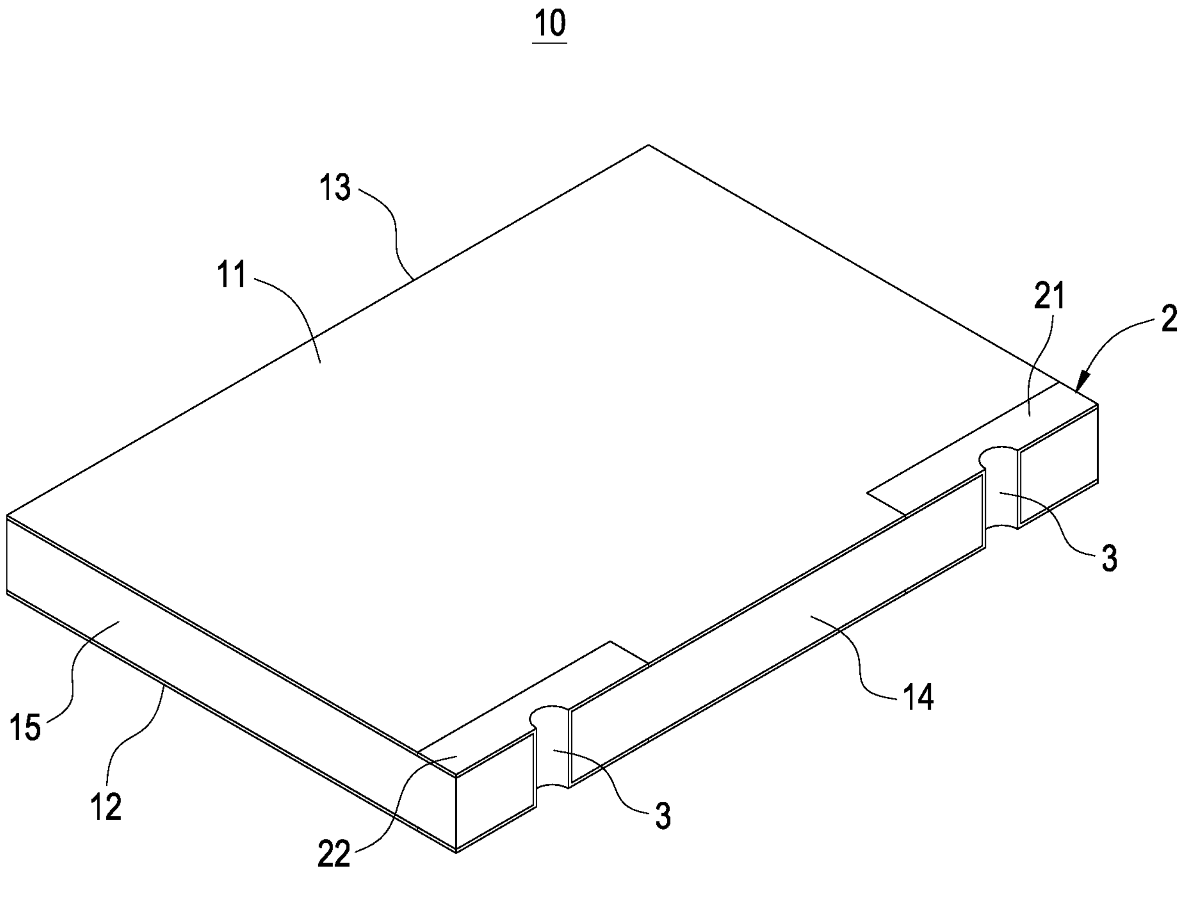
FIG. 5 shows a three-dimensional schematic diagram of the appearance of the vertical antenna structure of the second embodiment of the present disclosure.

FIG. 5 shows a three-dimensional schematic diagram of the appearance of the vertical antenna structure of the second embodiment of the present disclosure. Please refer to FIG. 1 to FIG. 4 at the same time. As shown in FIG. 5, the embodiment is substantially the same as the vertical antenna structure 10 of the first embodiment, except that the vertical antenna structure 10 further includes another semi-hole electrode layer 3 additionally arranged on the second electrode layer 22 of the electrode layer 2 of the vertical antenna structure 10.

Due to the design of the semi-hole electrode layer 3 of the vertical antenna structure 10, in addition to reducing the manufacturing cost of the vertical antenna structure 10, when the circuit board 1 and the main board 20 are electrically fixed and connected, there is no need to change the design of the original main board 20; the original structural design of the main board 20 is not destroyed; the vertical antenna structure 10 is electrically fixed and connected to the first electrode fixed-connection layer 205 and the second electrode fixed-connection layer 206 on the main board 20.

Figure 6:
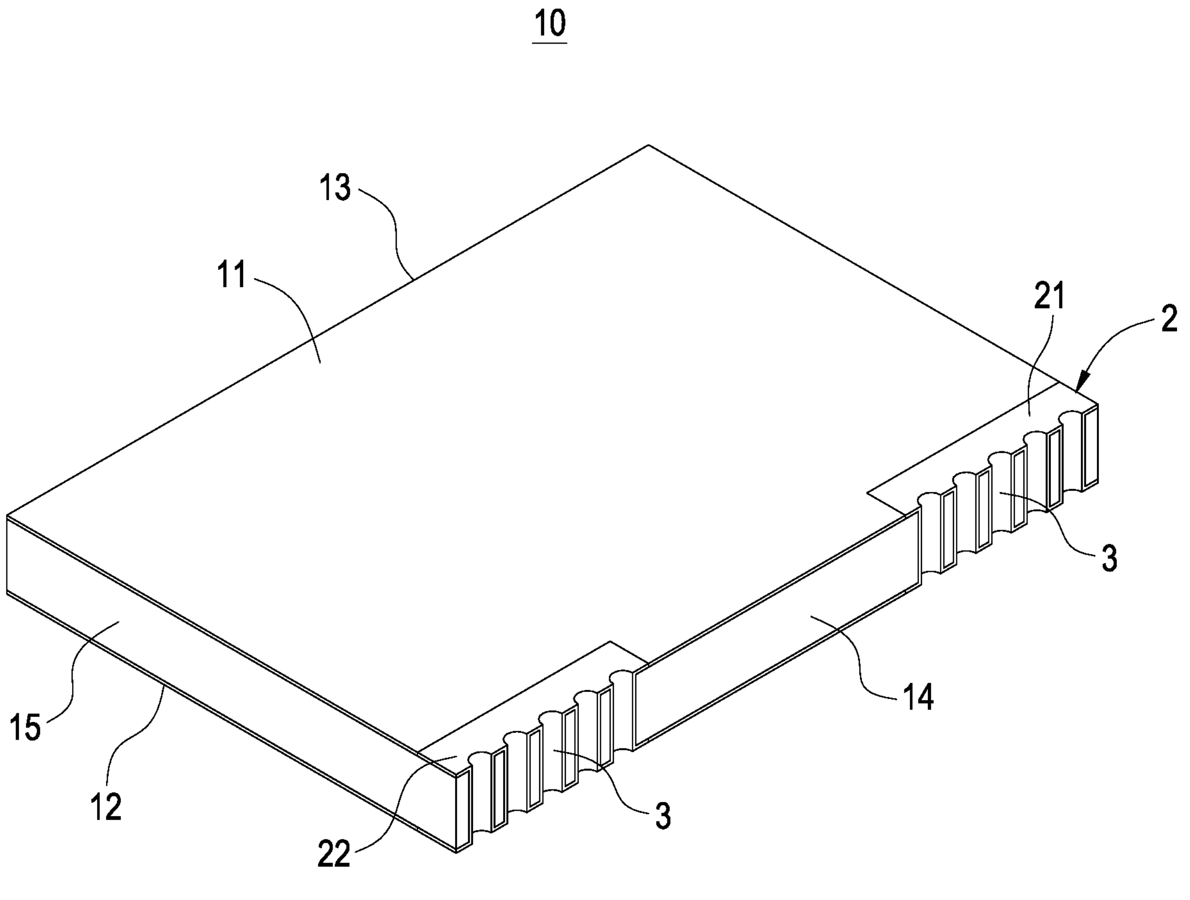
FIG. 6 shows a three-dimensional schematic diagram of the appearance of the vertical antenna structure of the third embodiment of the present disclosure.

FIG. 6 shows a three-dimensional schematic diagram of the appearance of the vertical antenna structure of the third embodiment of the present disclosure. Please refer to FIG. 1 to FIG. 5 at the same time. As shown in FIG. 6, the embodiment is substantially the same as the first embodiment and the second embodiment, except that the semi-hole electrode layer 3 on the first electrode layer 21 and the second electrode layer 22 of the electrode layer 2 of the vertical antenna structure 10 is a plurality of the semi-hole electrode layers 3 continuously connected together or is wavy, and is arranged on the bottom surface 14 of the circuit board 1, and is electrically connected to the first electrode layer 21 and the second electrode layer 22.

Due to the design of the semi-hole electrode layer 3 of the vertical antenna structure 10 is plural and continuously connected together, the manufacturing cost of the vertical antenna structure 10 may be further reduced; when the circuit board 1 and the main board 20 are electrically fixed and connected, there is also no need to change the design of the original main board 20; the original structural design of the main board 20 is not destroyed; the vertical antenna structure 10 is electrically fixed and connected to the first electrode fixed-connection layer 205 and the second electrode fixed-connection layer 206 on the main board 20.

Figure 7:
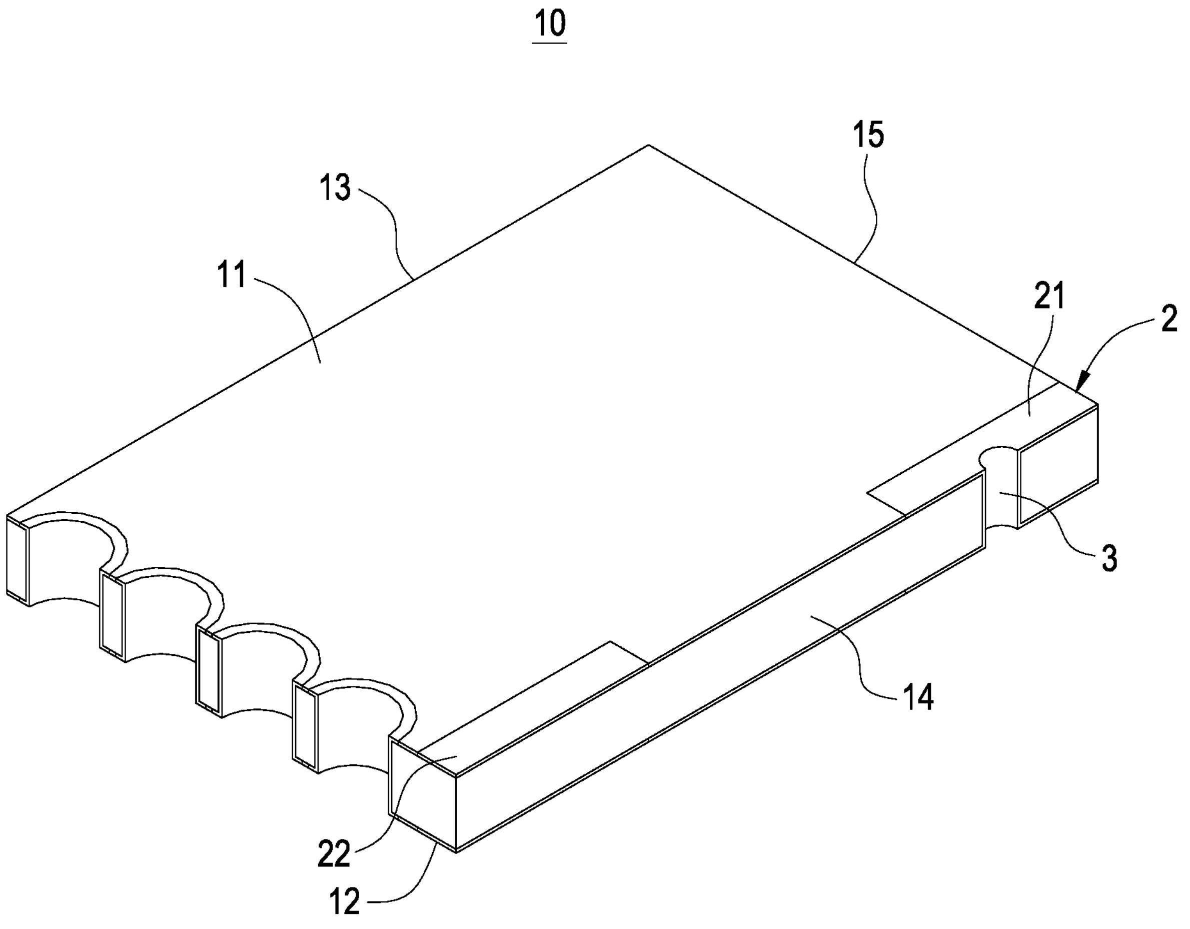
FIG. 7 shows a three-dimensional schematic diagram of the appearance of the vertical antenna structure of the fourth embodiment of the present disclosure.

FIG. 7 shows a three-dimensional schematic diagram of the appearance of the vertical antenna structure of the fourth embodiment of the present disclosure. Please refer to FIG. 1 to FIG. 6 at the same time. As shown in FIG. 7, the embodiment is substantially the same as the first embodiment, the second embodiment and the third embodiment, except that in addition to the semi-hole electrode layer 3 being arranged on the bottom surface 14 of the circuit board 1, the semi-hole electrode layer 3 may be arranged on the two side surfaces 15 or one of the two side surfaces 15 of the circuit board 1.

The semi-hole electrode layer 3 is designed to be electrically connected to the radiation layer (not shown in the figures) on the front surface 11 or the back surface 12 of the circuit board 1, so as to increase the length of the radiation layer, so as to adjust the transmitting-and-receiving frequency of the vertical antenna structure 10, and make the radiation pattern diagram of the vertical antenna structure 10 better, so as to improve the transmitting-and-receiving performance and gain of the vertical antenna structure 10.

However, the above description is only preferred embodiments of the present disclosure, and is not intended to limit the scope of patent protection of the present disclosure. Therefore, the present disclosure states that all equivalent changes made by using the specifications or drawings of the present disclosure are equally included within the scope of patent protection of the present disclosure.

What is claimed is:

1. A vertical antenna structure electrically fixed and connected to a main board of an electronic apparatus, the vertical antenna structure comprising: a circuit board, being a square body with a front surface, a back surface, a top surface, a bottom surface and two side surfaces; an electrode layer arranged on the front surface and the back surface of the circuit board; and a semi-hole electrode layer arranged on the bottom surface of the circuit board and electrically fixed and connected to the electrode layer, wherein the electrode layer and the semi-hole electrode layer are electrically fixed and connected to the main board;

wherein the electrode layer comprises a first electrode layer and a second electrode layer arranged on the front surface and the back surface of the circuit board, and close to an edge of the bottom surface;

wherein the main board comprises a first ground layer, a second ground layer, a first clearance zone, a second clearance zone, a first electrode fixed-connection layer and a second electrode fixed-connection layer; the first ground layer is arranged on a front face of the main board; the second ground layer is arranged on a back face of the main board and is arranged symmetrically with the first ground layer; the first clearance zone is arranged on the front face of the main board; the second clearance zone is arranged on the back face of the main board and is arranged symmetrically with the first clearance zone; the first electrode fixed-connection layer and the second electrode fixed-connection layer are arranged on the first clearance zone of the main board; the first electrode fixed-connection layer and the second electrode fixed-connection layer are electrically fixed and connected to the first electrode layer and the second electrode layer respectively.

2. The vertical antenna structure of claim 1, further comprising a plurality of radiation layers with different patterns arranged on the front surface and the back surface of the circuit board respectively.

3. The vertical antenna structure of claim 2, wherein the radiation layers comprise a high-frequency radiation layer or a low-frequency radiation layer, or the radiation layers comprise the high-frequency radiation layer and the low-frequency radiation layer.

4. The vertical antenna structure of claim 2, wherein the semi-hole electrode layer is arranged on the two side surfaces or one of the two side surfaces of the circuit board.

5. The vertical antenna structure of claim 4, wherein the semi-hole electrode layer is electrically connected to the radiation layer on the front surface or the back surface of the circuit board, so as to extend a length of the radiation layer and adjust a transmitting-and-receiving frequency of the vertical antenna structure.

6. The vertical antenna structure of claim 1, wherein the semi-hole electrode layer is electrically connected to the first electrode layer or the second electrode layer, or the semi-hole electrode layer is electrically connected to the first electrode layer and the second electrode layer respectively.

7. The vertical antenna structure of claim 1, further comprising a plurality of the semi-hole electrode layers connected to each other continuously.

8. The vertical antenna structure of claim 1, wherein the semi-hole electrode layer is wavy, and is arranged on the bottom surface of the circuit board, and is electrically connected to the first electrode layer and the second electrode layer.

9. The vertical antenna structure of claim 1, wherein the main board further comprises a signal feed-in layer arranged on the front face of the main board and coupled with the first ground layer; the signal feed-in layer is electrically connected to the first electrode fixed-connection layer.

10. The vertical antenna structure of claim 1, wherein the main board further comprises a matching element electrically connected between the second electrode fixed-connection layer and the first ground layer to adjust an antenna frequency characteristic.

11. The vertical antenna structure of claim 1, wherein the semi-hole electrode layer is semi-circular, semi-elliptical or polygonal.

* * * * *